United States Patent
Hicks et al.

(10) Patent No.: US 11,630,663 B2
(45) Date of Patent: Apr. 18, 2023

(54) COMPRESSING MULTI-ATTRIBUTE VECTOR INTO A SINGLE EIGENVALUE FOR RANKING SUBJECT MATTER EXPERTS

(71) Applicant: International Business Machines Corporation, Armonk, NY (US)

(72) Inventors: Andrew C. M. Hicks, Wappingers Falls, NY (US); Robert Peter Catalano, Montgomery, NY (US); Tyler Vezio Rimaldi, Mahopac, NY (US); Daniel Nicolas Gisolfi, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 28 days.

(21) Appl. No.: 17/121,806

(22) Filed: Dec. 15, 2020

(65) Prior Publication Data
US 2022/0188105 A1   Jun. 16, 2022

(51) Int. Cl.
  *G06F 8/77* (2018.01)
  *G06F 8/71* (2018.01)
  *G06T 11/20* (2006.01)

(52) U.S. Cl.
  CPC .......... *G06F 8/77* (2013.01); *G06F 8/71* (2013.01); *G06T 11/206* (2013.01)

(58) Field of Classification Search
  CPC ..... G06F 8/34; G06F 8/71; G06F 8/75; G06T 7/97
  See application file for complete search history.

(56) References Cited

U.S. PATENT DOCUMENTS

| 7,865,457 B2 | 1/2011 | Ravin et al. |
| 9,171,309 B2 * | 10/2015 | An .................. G06Q 30/02 |
| 10,657,117 B2 | 5/2020 | Arora et al. |
| 2006/0177808 A1 * | 8/2006 | Aosawa ............... G06F 40/30 434/322 |

(Continued)

OTHER PUBLICATIONS

Visual Paradigm, "Radar Chart Example: Employee Skill Analysis", URL: https://online.visual-paradigm.com/diagrams/templates/radar-chart/employee-skill-analysis/, Retrieved: Dec. 3, 2020, 5 pages.

*Primary Examiner* — Geoffrey R St Leger
*Assistant Examiner* — Cheneca Smith
(74) *Attorney, Agent, or Firm* — Cantor Colburn LLP; Teddi Maranzano

(57) ABSTRACT

Aspects of the invention include determining, by a processor, a code segment of a computer code, analyzing the code segment to determine one or more other code segments associated with the code segment, determining a set of subject matter experts (SMEs) associated with the code segment and the one or more other code segments, obtaining SME data for each SME in the set of SMEs, wherein the SME data comprises a set of attributes associated with the SME, generating, by the processor, a graphical representation of the set of attributes for each SME in the set of SMEs, transforming the graphical representations into an eigenvectors and eigenvalues, and ranking the SMEs based on their associated eigenvectors and eigenvalues.

14 Claims, 6 Drawing Sheets

(56) References Cited

U.S. PATENT DOCUMENTS

| | | | |
|---|---|---|---|
| 2014/0137074 A1* | 5/2014 | Hey | G06Q 10/063112 |
| | | | 717/101 |
| 2015/0339616 A1 | 11/2015 | Pursche et al. | |
| 2016/0179812 A1* | 6/2016 | Briggs | G06F 16/24578 |
| | | | 717/101 |
| 2018/0232421 A1* | 8/2018 | Dialani | G06F 16/285 |
| 2021/0406449 A1* | 12/2021 | Meling | G06F 40/166 |

* cited by examiner

COMPRESSING MULTI-ATTRIBUTE VECTOR INTO A SINGLE EIGENVALUE FOR RANKING SUBJECT MATTER EXPERTS

BACKGROUND

The present invention generally relates to subject matter expert (SME) ranking, and more specifically, to compressing multi-attribute input into a single eigenvalue for SME ranking.

In computer science, code libraries are available to software developers to facilitate the writing of code. Code libraries store source code written in various programming languages, which are available to programmers to reduce the amount of work and time expended, by providing pre-written code that can be incorporated into a program without requiring a programmer to create the code from scratch. Libraries can include sets of predefined modules, or functions, each having a defined interface that is used to invoke a particular behavior. Library code can be reused across any number of independent software programs, and often multiple libraries are accessed when code is written. Computer programmers responsible for pieces of code in a library can be identified as SMEs. In some cases, it may be desirable, for a given piece of code, to determine a SME, for example, if a potential defect is encountered.

SUMMARY

Embodiments of the present invention are directed to code analysis and subject matter expertise ranking. A non-limiting example computer-implemented method includes determining, by a processor, a code segment of a computer code, analyzing the code segment to determine one or more other code segments associated with the code segment, determining a set of subject matter experts (SMEs) associated with the code segment and the one or more other code segments, obtaining SME data for each SME in the set of SMEs, wherein the SME data comprises a set of attributes associated with the SME, generating, by the processor, a graphical representation of the set of attributes for each SME in the set of SMEs, transforming the graphical representations into an eigenvectors and eigenvalues, and ranking the SMEs based on their associated eigenvectors and eigenvalues.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
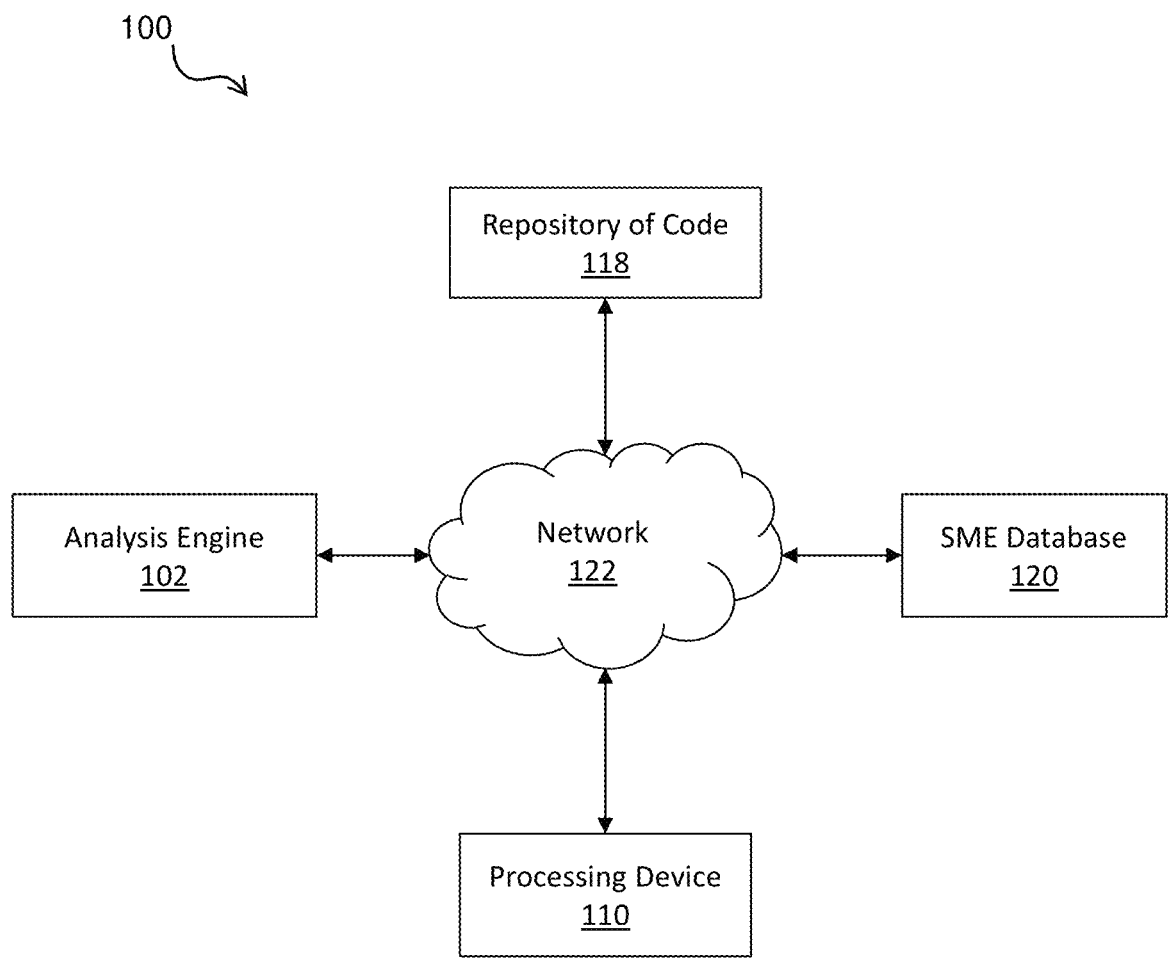
FIG. 1 depicts a system for code analysis and subject matter expert identification in accordance with one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide subject matter expert (SME) identification for computer software. One or more embodiments of the invention include a code analysis and/or SME identification system that is configured to determine correlations between computer code and SMEs. In one or more embodiments, the system utilizes a graphical method of displaying multivariate data in the form of a two-dimensional chart of three or more quantitative variables represented on axes starting from the same point. This two-dimensional chart is known as a radar chart. In one or more embodiments of the invention, the radar chart can be converted to a multi-dimensional eigenvector having a corresponding eigenvalue which can be utilized to facilitate the identification and ranking of one or more subject matter experts (SMEs) associated with a given code segment.

Software continues to become more ubiquitous. Tasks that were previously performed manually are increasingly being automated using software. Furthermore, previous tasks that were automated are often rebuilt to increase functionality, performance, and/or efficiency. Accordingly, both the volume of software projects and the sizes of individual software projects are growing. As the volume and sizes of software projects increase, there is increasing risk for errors in the developed code. For example, software may be developed using proprietary or low-level programming code that is relatively unknown. As another example, the sheer size of some software projects makes it difficult to detect errors. Finally, the size and volume of software projects increasingly makes it impractical for programmers to identify other programmers that are so called subject matter experts in both the field of programming and who have expertise in a specific segment or portion of code in a larger software project.

To address one or more of the shortcomings described above, in one or more embodiments of the invention includes a system that can receive a segment of code as input for analysis. Here, segment of code can refer to a word, phrase, operation, sequence, bundle, module, or other segment of code. Code, generally speaking, can be software code, firmware code, source code, programming code, or any other code written in any coding language now known or later developed. The analysis of the segment of code can return a set of potential subject matter experts that have an association with the particular segment of code. That association can include, but is not limited to, being the original author of the code, being a commenter on the code, being a supervisor of the code development, being an editor of the original code, being a debugger of the code, and any other association to the specific code. In addition, the system can seek out other segments of code that are similar to the subject segment of code and identify additional potential SMEs associated with the other segments of code.

In one or more embodiments of the invention, the set of SMEs identified above can be ranked based on a plurality of quantitative factors including, but not limited to, a commit date, a commit rate, the number of edits performed, being the last editor, being the first editor, and more. These factors can be unitized to develop a graphical representation of each SMEs skill set based on the quantitative factors. One specific graphical method is the radar chart. This radar chart can be converted into a corresponding eigenvector and eigenvalue which can be assigned to each SME. While the radar chart is a two-dimensional graph structure, it will include many rays that are each representing a flattened dimension. Compressing this radar chart representation can yield an associated eigenvalue. The eigenvalue created for the SME can be utilized as a ranking for the SMEs in the identified SMEs. Using an eigenvalue allows for a simple numerical value to be assigned to essentially a set of disjoin attributes (e.g., the quantitative factors).

FIG. 1 depicts a system 100 for code analysis and SME identification in accordance with one or more embodiments of the present invention. Embodiments of the system 100 of FIG. 1 can be implemented in conjunction with any appropriate computer system for any of the components in system 100, including but not limited to the computer system 600 of FIG. 6, and or the cloud computing system of FIGS. 4 and 5.

The system 100 includes an analysis engine 102 configured to receive an input in the form of code information. The code information can include, but is not limited to, a segment of code and/or other information related to a line or set of code, such as an author or authors, comment history, version numbers, a code library, an owner of a code library, error rate history, debugging history, and the like. As mentioned above, segment of code can be any of a word, phrase, function, operation, sequence, bundle, module, other segment of code, and/or other recognizable string of values. The analysis engine 102 is configured and/or operable to receive a segment of code from a user through the processing device 110 or alternatively, the segment of code can be received from any other system connected to the network 122, either manually or automatically based on an occurrence of an event. The analysis engine 102 can analyze the segment of code to identify other segments of code and/or software projects that are similar to the subject segment of code by accessing the code repository 118. The code repository 188 can include a code base of source code that can be written in any appropriate computer programming language(s) and can include any appropriate number of files.

The code repository 118 can include any number of private and public code repositories in accordance with various embodiments of the invention. The source code in code repository 118 can use any number of libraries, and the libraries can be any appropriate types of libraries, including but not limited to standard libraries, custom libraries, dynamic libraries, and static libraries. The code repository 118 may include additional information to facilitate searching. For example, each code repository can include a respective library usage data file that includes data (e.g., location data) regarding each library call in the source code of the corresponding code repository. For example, a library usage data file can include a list of library calls and their respective locations in the source code of the code repository 118. The analysis engine 102 may determine SMEs related to the segment(s) of code, for example, by identifying an owner of the library or libraries from which portions of code were called. The data associated with these SMEs can be stored in the SME database 120. Also, the system 100 of FIG. 1 includes version control metadata associated with the code repository 118, which include data regarding the identity of the computer programmer(s) that wrote each unit (e.g., line or snippet) of source code in the code repository 118. Particular computer programmers that are SMEs related to a library that can be determined based on the determined matching library calls and version control metadata.

In one or more embodiments of the invention, the analysis engine 102 can extract quantitative attributes associated with an identified set of SMEs taken from the SME database 120. The identified set of SMEs can be determined based on their association with the inputted segment of code and/or the other code determined to be similar. The code can be determined to be similar using tools such as, for example, fuzzy matching and stop word filtering which can recuse a line of code to its basics. For example: complex_function (64, fixed, high_pref, 'ran out of fixed storage'). When assessing this pseudocode function call, notice that one of the parameters uses loose text (i.e., the 'ran out of fixed storage'). If this is abstracted out, the system 100 identify other SMEs that wrote code under the search complex_function(64, fixed, high_pref, *), where the * denotes any variant in that space. This allows the system 100 to find someone knowledgeable on the subject despite it not being an exact match. The quantitative attributes can be representative of an SMEs knowledge base and/or skill. These attributes can be analyzed by the graphical module 106 and transformed into a graphical representation such as a radar chart. A radar chart allows for a visual representation of an SMEs skill set which can be displayed to a user through a display for the processing device 110. For each SME in the identified set of SMEs, a radar chart displaying the SME skill set can be generated by the graphical module 106 through the analysis engine 102. Each radar chart can be converted and compressed into an associated eigenvector and eigenvalue. An eigenvector or characteristic vector of a linear transformation is a nonzero vector that changes by a scalar factor when that linear transformation is applied to it. The corresponding eigenvalue, often denoted by lambda $\lambda$, is the factor by which the eigenvector is scaled. The eigenvalue can be a numerical representation of the SMEs rank or score with respect to the other identified SMEs. A user can select or the analysis engine 102 can select one or more SMEs with the highest eigenvalues derived from the radar charts.

Figure 2:
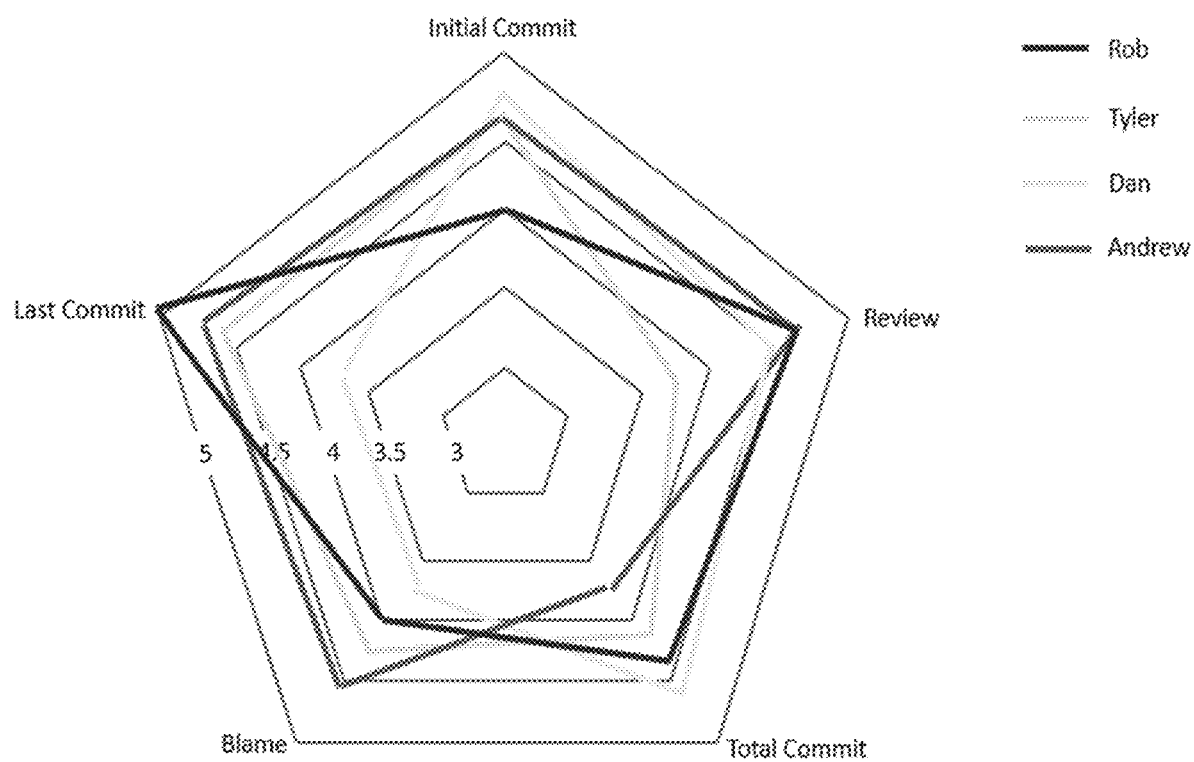
FIG. 2. depicts an exemplary radar chart according to one or more embodiments of the invention.

In one or more embodiments of the invention, the analysis engine 102 can receive from the processing device 110 additional inputs either automatically or from a user. After a segment of code is analyzed as outlined above, the radar charts (or other graphical representations) can be displayed to a user of the processing device 110. The radar chart is a chart and/or plot that consists of a sequence of equiangular spokes, called radii, with each spoke representing one of the variables. The data length of a spoke is proportional to the magnitude of the variable for the data point relative to the maximum magnitude of the variable across all data points. A line is drawn connecting the data values for each spoke. Radar charts are a useful way to display multivariate observations with an arbitrary number of variables. Each star in a radar chart represents a single observation (i.e., attribute in this context). Typically, radar charts are generated in a multi-plot format with many stars on each page and each star representing one observation. FIG. 2. depicts an exemplary radar chart according to one or more embodiments of the invention. The radar chart 200 is a two-dimensional structure including many rays each representing a flattened dimension. The eigenvector can be calculated from this radar graph having the following attributes: SME_Ratings [Initial_Commit, Review, Total_Commit, Blame, Last_Commit]. In the example for Rob, the vector would be [4.1, 4.7, 4.5, 4, 5]. This vector can be compressed to an eigenvalue. The resultant eigenvalue for Rob would be 9.09725 which would correspond to Rob's ranking as an SME. In this example, there are 5 dimensions being represented and then compressed into a single unit vector in the form of an eigenvalue. In one or more embodiments of the invention, a user can adjust the attribute weighting for the quantitative attributes by introducing an importance factor for each attribute that can adjust the value for each attribute. By visualizing each SMEs skill set in a radar chart, the user can then make adjustments to this weighting to meet requirements for the need for the SME related to the segment of code. For example, original authors of code may be weighted more heavily for projects in the early stage of development versus debuggers and final editors would be weighted more heavy in late stage projects for similar coding projects. This additional weighting can be inputted, through the processing device 110, such that the analysis engine 102 can adjust the radar maps for each identified SME. The corresponding eigenvectors and eigenvalues would likewise be adjusted and the ranking/scoring would change based on these user inputs designating what factors are of the most importance. In one or more embodiments of the invention, the weighting can be user defined and act as a parameter the user can input. For example, when picking an SME who has the most knowledge, the user can lessen the weight or value of any other attribute for the SMEs.

In one or more embodiments of the invention, the analysis engine 102 returns the set of SMEs and the corresponding ranking based on the eigenvalues and eigenvectors. The analysis engine 102 also notify the SME that they have been selected for a software project by sending them a notification through the network 122 via an e-mail or other communication.

It is to be understood that the block diagram of FIG. 1 is not intended to indicate that the system 100 is to include all of the components shown in FIG. 1. Rather, the system 100 can include any appropriate fewer or additional components not illustrated in FIG. 1 (e.g., additional memory components, embedded controllers, functional blocks, connections between functional blocks, modules, inputs, outputs, code repositories, files, etc.). Further, the embodiments described herein with respect to system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 3:
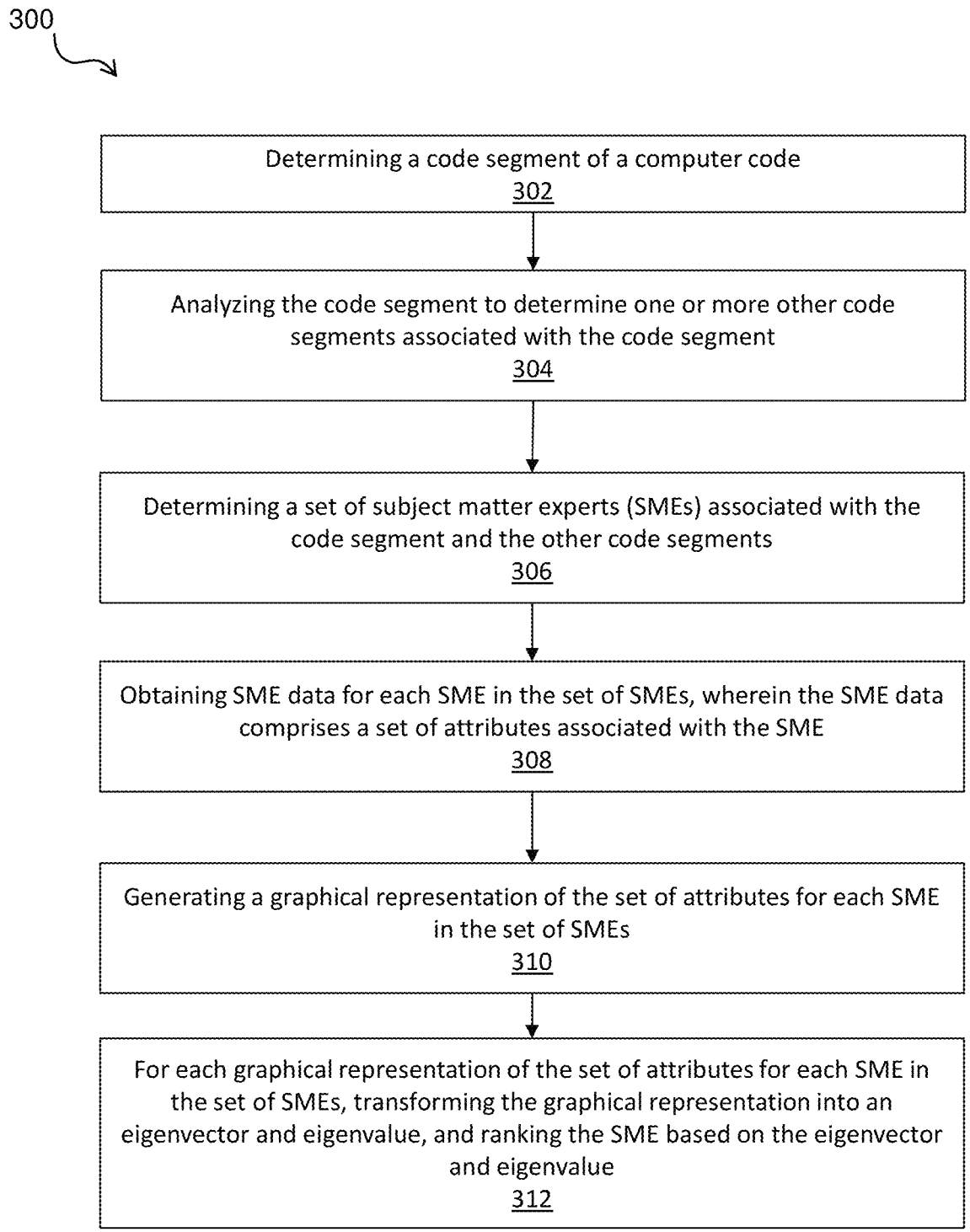
FIG. 3 depicts a flow diagram of a method for code analysis and subject matter expert identification according to one or more embodiments of the invention.
Figure 6:
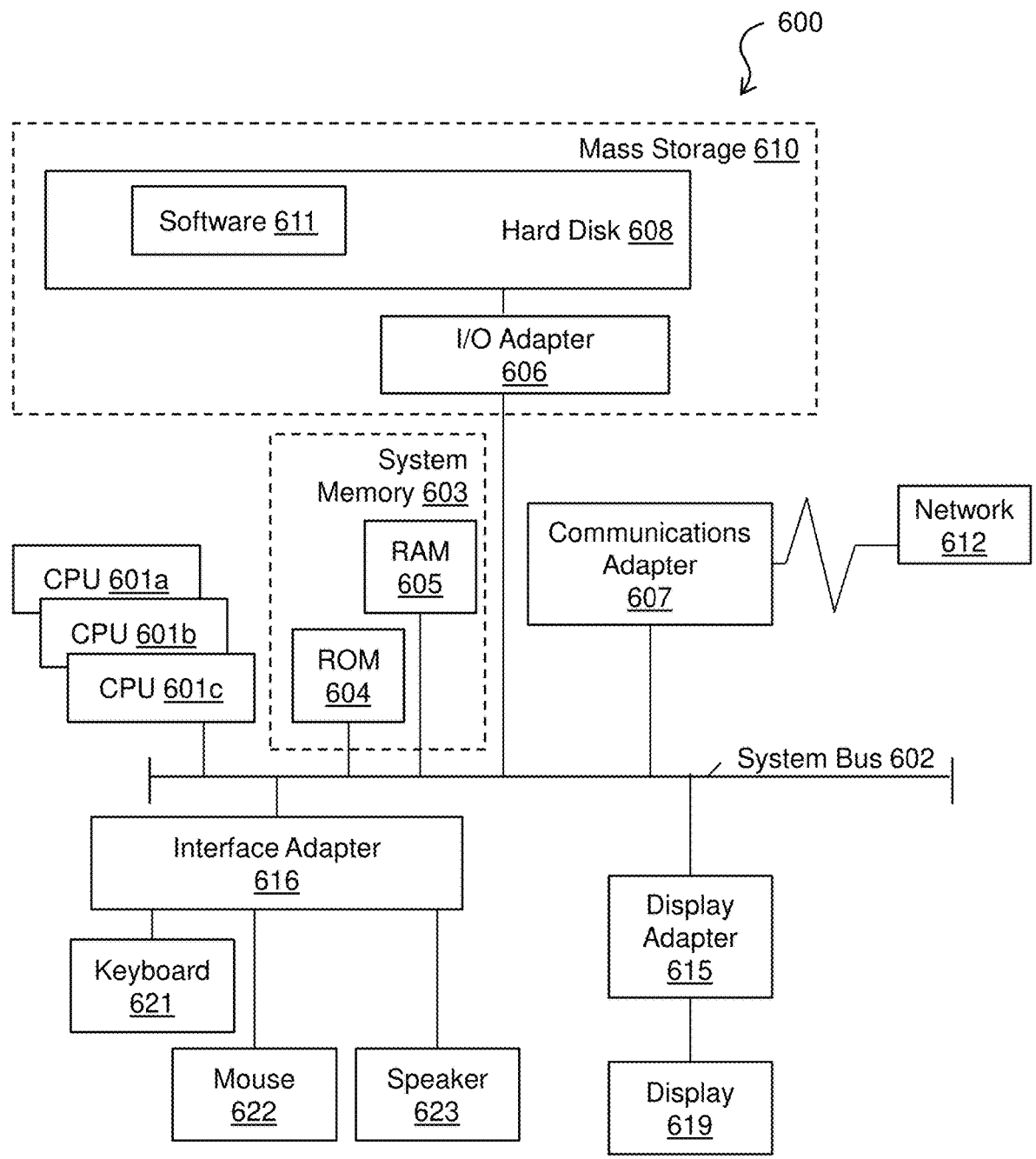
FIG. 6 depicts a processing system for implementing one or more embodiments of the present invention.

FIG. 3 depicts a flow chart of a method 300 for determining a subject matter expert according to one or more embodiments of the invention. Method 300 is an overview of a general method that accomplishes the above-described tasks. Method 300 is merely exemplary and is not limited to the embodiments presented herein. Method 300 can be employed in many different embodiments or examples not specifically depicted or described herein. In some embodiments, the procedures, processes, and/or activities of method 300 can be performed in the order presented. In other embodiments, one or more of the procedures, processes, and/or activities of method 300 can be combined or skipped. In some embodiments, portions of method 300 can be implemented by computer system 600 (FIG. 6).

In one or more embodiments of the invention, the method 300 includes determining, by a processor, a code segment of a computer code, as shown in block 302. Determining the code segment can include obtaining and/or receiving the code segment. At block 304, the method 300 includes analyzing the code segment to determine one or more other code segments associated with the code segment. Here, the other code segments can have similar function, be in a similar coding language, have a similar development history, and/or utilize similar call functions, and the like. The method 300, at block 306, includes determining a set of subject matter experts (SMEs) associated with the code segment and the other code segments. These SMEs can be individuals that worked on the code segment or other code segments. Working on includes writing the code, managing development of the code, editing the code, debugging the code, and the like. At block 308, the method 300 includes obtaining SME data for each SME in the set of SMEs, wherein the SME data comprises a set of attributes associated with the SME. This SME data includes attributes for the SME such as their knowledge of certain programming languages, history with writing/debugging code performing the same or similar functions, and the like. The method 300 continues by including generating a graphical representation of the set of attributes for each SME in the set of SMEs, as shown in block 310. The graphical representation can be a radar chart that provides a meaningful visual of an SMEs skill set as compared with other SMEs. And for each graphical representation of the set of attributes for each SME in the set of SMEs, the method 300 includes transforming the graphical representation into an eigenvector and eigenvalue, and ranking the SME based on the eigenvector and eigenvalue, as shown in block 312. The eigenvalue can be a corresponding score associated with the ranking in one or more embodiments.

Additional processes may also be included. It should be understood that the processes depicted in FIG. 3 represent illustrations, and that other processes may be added or existing processes may be removed, modified, or rearranged without departing from the scope and spirit of the present disclosure.

In one or more embodiments of the invention, the system 100 can be connected with or apart of a larger system such as, for example, a software support system that works to assign SMEs to resolve errors internally or for a customer. In this example, the code segment causing the issue and/or other input such as description of the software issue can be used as an input to the analysis engine 102. The process described above can be utilized to identify an SME based on determined eigenvector and eigenvalues from the analysis engine 102. The SME having the highest ranking from the eigenvalues can be automatically assigned to the software support issue that was designated for an internal system or by a customer. Further, importance factors can be submitted to further refine the selection of an SME as outlined in the descriptions above.

In one or more embodiments of the invention, the analysis engine 102 can be implemented on the processing system 600 found in FIG. 6. Additionally, the cloud computing system 50 can be in wired or wireless electronic communication with one or all of the elements of the system 100. Cloud 50 can supplement, support or replace some or all of the functionality of the elements of the system 100. Additionally, some or all of the functionality of the elements of system 100 can be implemented as a node 10 (shown in FIGS. 4 and 5) of cloud 50. Cloud computing node 10 is only one example of a suitable cloud computing node and is not intended to suggest any limitation as to the scope of use or functionality of embodiments of the invention described herein.

In embodiments of the invention, the engine 102 can also be implemented as so-called classifiers (described in more detail below). In one or more embodiments of the invention, the features of the various engines/classifiers (102) described herein can be implemented on the processing system 600 shown in FIG. 6, or can be implemented on a neural network (not shown). In embodiments of the invention, the features of the engines/classifiers 102 can be implemented by configuring and arranging the processing system 600 to execute machine learning (ML) algorithms. In general, ML algorithms, in effect, extract features from received data (e.g., inputs to the engines 102) in order to "classify" the received data. Examples of suitable classifiers include but are not limited to neural networks (described in greater detail below), support vector machines (SVMs), logistic regression, decision trees, hidden Markov Models (HMIs), etc. The end result of the classifier's operations, i.e., the "classification," is to predict a class for the data. The ML algorithms apply machine learning techniques to the received data in order to, over time, create/train/update a unique "model." The learning or training performed by the engines/classifiers 102 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, anomaly detection, neural networks, deep learning, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
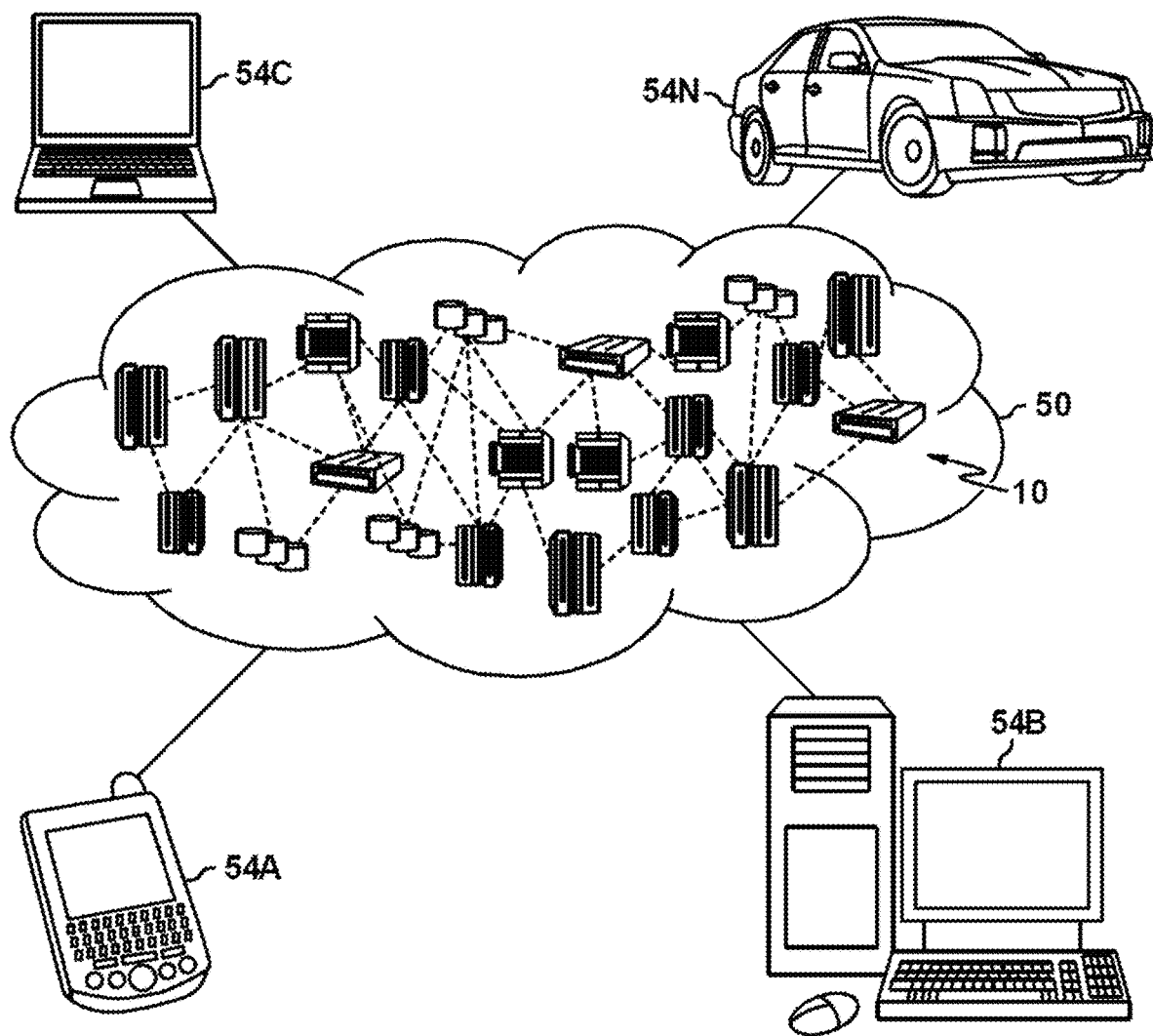
FIG. 4 depicts a cloud computing environment according to one or more embodiments of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
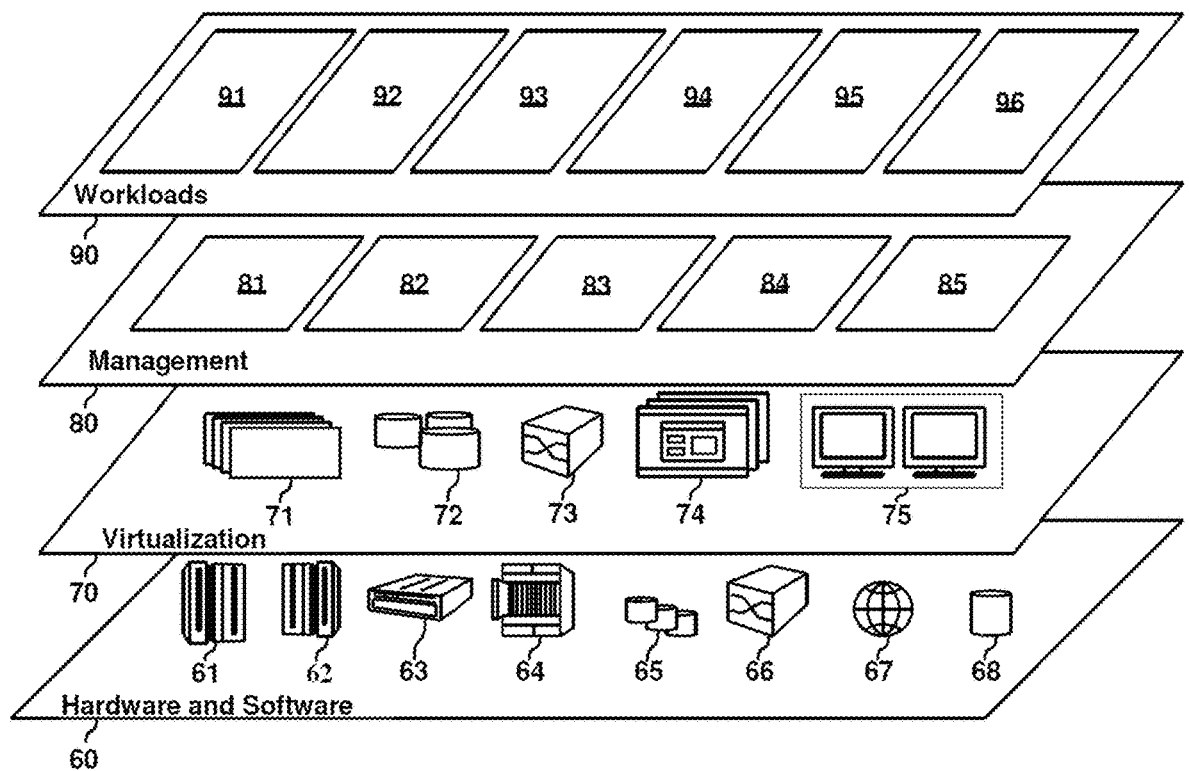
FIG. 5 depicts abstraction model layers according to one or more embodiments of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and code analysis and subject matter expertise identification 96.

Turning now to FIG. 6, a computer system 600 is generally shown in accordance with an embodiment. The computer system 600 can be an electronic, computer framework comprising and/or employing any number and combination of computing devices and networks utilizing various communication technologies, as described herein. The computer system 600 can be easily scalable, extensible, and modular, with the ability to change to different services or reconfigure some features independently of others. The computer system 600 may be, for example, a server, desktop computer, laptop computer, tablet computer, or smartphone. In some examples, computer system 600 may be a cloud computing node. Computer system 600 may be described in the general context of computer system executable instructions, such as program modules, being executed by a computer system. Generally, program modules may include routines, programs, objects, components, logic, data structures, and so on that perform particular tasks or implement particular abstract data types. Computer system 600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system 600 has one or more central processing units (CPU(s)) 601a, 601b, 601c, etc. (collectively or generically referred to as processor(s) 601). The processors 601 can be a single-core processor, multi-core processor, computing cluster, or any number of other configurations. The processors 601, also referred to as processing circuits, are coupled via a system bus 602 to a system memory 603 and various other components. The system memory 603 can include a read only memory (ROM) 604 and a random access memory (RAM) 605. The ROM 604 is coupled to the system bus 602 and may include a basic input/output system (BIOS), which controls certain basic functions of the computer system 600. The RAM is read-write memory coupled to the system bus 602 for use by the processors 601. The system memory 603 provides temporary memory space for operations of said instructions during operation. The system memory 603 can include random access memory (RAM), read only memory, flash memory, or any other suitable memory systems.

The computer system 600 comprises an input/output (I/O) adapter 606 and a communications adapter 607 coupled to the system bus 602. The I/O adapter 606 may be a small computer system interface (SCSI) adapter that communicates with a hard disk 608 and/or any other similar component. The I/O adapter 606 and the hard disk 608 are collectively referred to herein as a mass storage 610.

Software 611 for execution on the computer system 600 may be stored in the mass storage 610. The mass storage 610 is an example of a tangible storage medium readable by the processors 601, where the software 611 is stored as instructions for execution by the processors 601 to cause the computer system 600 to operate, such as is described herein below with respect to the various Figures. Examples of computer program product and the execution of such instruction is discussed herein in more detail. The communications adapter 607 interconnects the system bus 602 with a network 612, which may be an outside network, enabling the computer system 600 to communicate with other such systems. In one embodiment, a portion of the system memory 603 and the mass storage 610 collectively store an operating system, which may be any appropriate operating system, such as the z/OS or AIX operating system from IBM Corporation, to coordinate the functions of the various components shown in FIG. 6.

Additional input/output devices are shown as connected to the system bus 602 via a display adapter 615 and an interface adapter 616 and. In one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by a display adapter 615, which may include a graphics controller to improve the performance of graphics intensive applications and a video controller. A keyboard 621, a mouse 622, a speaker 623, etc. can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 6, the computer system 600 includes processing capability in the form of the processors 601, and, storage capability including the system memory 603 and the mass storage 610, input means such as the keyboard 621 and the mouse 622, and output capability including the speaker 623 and the display 619.

In some embodiments, the communications adapter 607 can transmit data using any suitable interface or protocol, such as the internet small computer system interface, among others. The network 612 may be a cellular network, a radio network, a wide area network (WAN), a local area network (LAN), or the Internet, among others. An external computing device may connect to the computer system 600 through the network 612. In some examples, an external computing device may be an external webserver or a cloud computing node.

It is to be understood that the block diagram of FIG. 6 is not intended to indicate that the computer system 600 is to include all of the components shown in FIG. 6. Rather, the computer system 600 can include any appropriate fewer or additional components not illustrated in FIG. 6 (e.g., additional memory components, embedded controllers, modules, additional network interfaces, etc.). Further, the embodiments described herein with respect to computer system 600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    determining, by a processor, a code segment of a computer code, wherein determining the code segment for the computer code comprises receiving a support request for a software issue related to the code segment;
    analyzing the code segment to determine one or more other code segments associated with the code segment;
    determining a set of subject matter experts (SMEs) associated with the code segment and the one or more other code segments, wherein the set of SMEs include an original author of the code segment, a commenter on the code segment, a supervisor of a development of the code segment, an editor of the code segment, and a debugger of the code segment;
    obtaining SME data for each SME in the set of SMEs, wherein the SME data comprises a set of attributes associated with the SME;
    receiving a user input comprising an importance factor for each attribute in the set of attributes;
    weighting each attribute in the set of attributes based on the importance factor;
    generating, by the processor, a graphical representation of the set of attributes for each SME in the set of SMEs based at least in part on the weighting for each attribute in the set of attributes;
    transforming the graphical representations into a set of eigenvectors each corresponding to one of the set of SMEs and calculating an eigenvalue for each of the set of SMEs based on the corresponding eigenvector;
    ranking the SMEs based on their associated eigenvalues; and
    automatically assigning the SME of the set of SMEs having a highest ranking from the eigenvalues to the support request.

2. The computer-implemented method of claim 1, further comprising: returning the set of SMEs and associated ranking for each SME.

3. The computer-implemented method of claim 1, wherein the graphical representation of the SME data comprises a radar chart.

4. The computer-implemented method of claim 1, wherein ranking the SMEs based on the eigenvalues comprises generating a score corresponding to the eigenvalue.

5. The computer-implemented method of claim 1, wherein the set of attributes for each SME comprises at least one of a debugging history, comment history, original author history, and error rate history.

6. A system comprising: a memory having computer readable instructions; and one or more processors for executing the computer readable instructions, the computer readable instructions controlling the one or more processors to perform operations comprising:
    determining, by a processor, a code segment of a computer code, wherein determining the code segment for the computer code comprises receiving a support request for a software issue related to the code segment;
    analyzing the code segment to determine one or more other code segments associated with the code segment;
    determining a set of subject matter experts (SMEs) associated with the code segment and the one or more other code segments, wherein the set of SMEs include an original author of the code segment, a commenter on the code segment, a supervisor of a development of the code segment, an editor of the code segment, and a debugger of the code segment;
    obtaining SME data for each SME in the set of SMEs, wherein the SME data comprises a set of attributes associated with the SME;
    receiving a user input comprising an importance factor for each attribute in the set of attributes;
    weighting each attribute in the set of attributes based on the importance factor;
    generating, by the processor, a graphical representation of the set of attributes for each SME in the set of SMEs based at least in part on the weighting for each attribute in the set of attributes;
    transforming the graphical representations into a set of eigenvectors each corresponding to one of the set of SMEs and calculating an eigenvalue for each of the set of SMEs based on the corresponding eigenvector;
    ranking the SMEs based on their associated eigenvalues; and
    automatically assigning the SME of the set of SMEs having a highest ranking from the eigenvalues to the support request.

7. The system of claim 6, further comprising: returning the set of SMEs and associated ranking for each SME.

8. The system of claim 6, wherein the graphical representation of the SME data comprises a radar chart.

9. The system of claim 6, wherein ranking the SMEs based on the eigenvalues comprises generating a score corresponding to the eigenvalue.

10. A computer program product comprising a computer readable storage medium having program instructions embodied therewith, the program instructions executable by a processor to cause the processor to perform operations comprising:

determining, by a processor, a code segment of a computer code, wherein determining the code segment for the computer code comprises receiving a support request for a software issue related to the code segment;

analyzing the code segment to determine one or more other code segments associated with the code segment;

determining a set of subject matter experts (SMEs) associated with the code segment and the one or more other code segments, wherein the set of SMEs include an original author of the code segment, a commenter on the code segment, a supervisor of a development of the code segment, an editor of the code segment, and a debugger of the code segment;

obtaining SME data for each SME in the set of SMEs, wherein the SME data comprises a set of attributes associated with the SME;

receiving a user input comprising an importance factor for each attribute in the set of attributes;

weighting each attribute in the set of attributes based on the importance factor;

generating, by the processor, a graphical representation of the set of attributes for each SME in the set of SMEs based at least in part on the weighting for each attribute in the set of attributes;

transforming the graphical representations into a set of eigenvectors each corresponding to one of the set of SMEs and calculating an eigenvalue for each of the set of SMEs based on the corresponding eigenvector;

ranking the SMEs based on their associated eigenvalues; and automatically assigning the SME of the set of SMEs having a highest ranking from the eigenvalues to the support request.

11. The computer program product of claim 10, further comprising: returning the set of SMEs and associated ranking for each SME.

12. The computer program product of claim 10, wherein the graphical representation of the SME data comprises a radar chart.

13. The computer program product of claim 10, wherein ranking the SMEs based on the eigenvalues comprises generating a score corresponding to the eigenvalue.

14. The computer program product of claim 10, wherein the set of attributes for each SME comprises at least one of a debugging history, comment history, original author history, and error rate history.

\* \* \* \* \*